No. 658,525. Patented Sept. 25, 1900.
E. C. HUSE.
PLATFORM CAR.
(Application filed May 31, 1900.)
(No Model.)
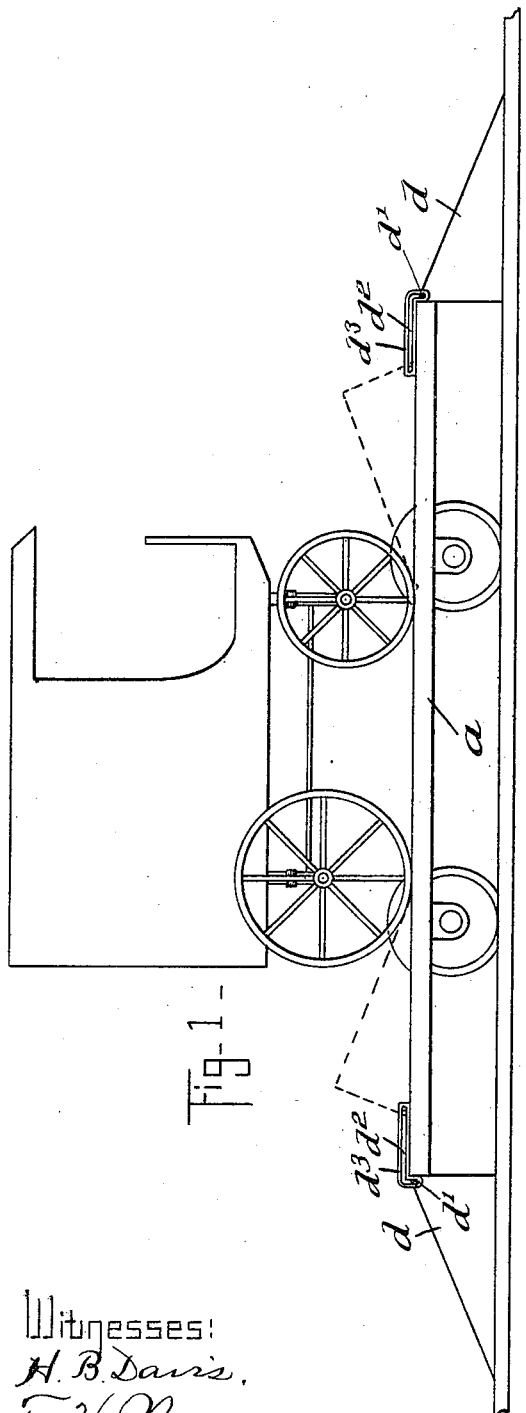
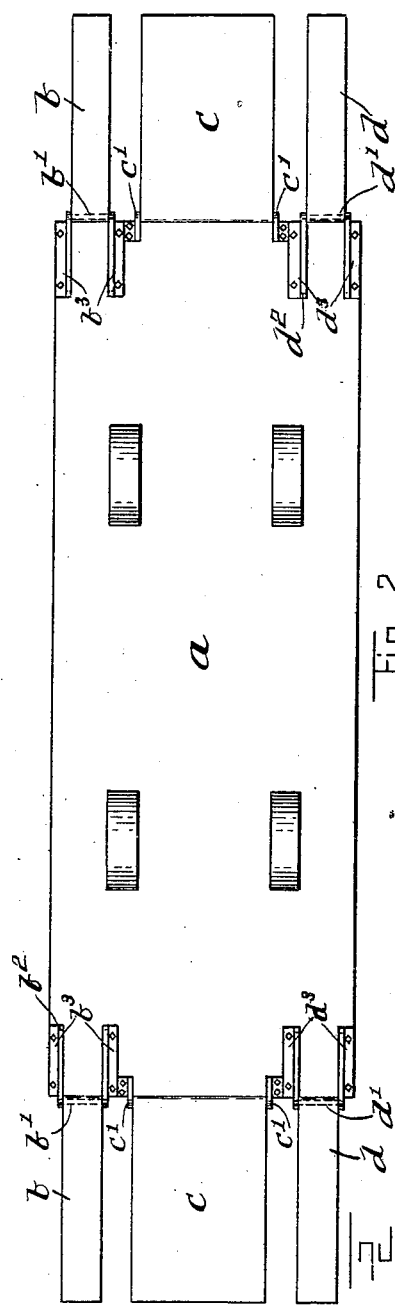
Witnesses:
H. B. Davis.
F. H. Noyes
Inventor:
Edward C. Huse
by B. J. Noyes
Atty.

UNITED STATES PATENT OFFICE.

EDWARD C. HUSE, OF SOMERVILLE, MASSACHUSETTS.

PLATFORM-CAR.

SPECIFICATION forming part of Letters Patent No. 658,525, dated September 25, 1900.

Application filed May 31, 1900. Serial No. 18,581. (No model.)

*To all whom it may concern:*

Be it known that I, EDWARD C. HUSE, of Somerville, county of Middlesex, State of Massachusetts, have invented an Improvement in Platform-Cars, of which the following description, in connection with the accompanying drawings, is a specification, like letters on the drawings representing like parts.

This invention has for its object to provide a platform-car with suitable means whereby a wagon may be drawn onto the car and its wheels trigged and afterward drawn off of the car.

This invention is of especial advantage in connection with suburban express service, for by its use a loaded express-wagon may be drawn onto a car at any point *en route* and the horse detached, and at any other point another horse may be hitched to the wagon and draw it off of the car; yet the invention of course may be put to many other purposes.

The invention consists in providing the platform of a car with pivoted runways at each end, which may be swung on their pivots so as to project from the end of the platform in order that the wagon may be drawn onto the platform and afterward may be turned over upon the platform of the car and serve as trigs for the wheels of the wagon. There may be at each end of the platform three such runways arranged in parallelism, the two outside ones being used for the wheels of the wagon and the intermediate one for the horse, or any other number may be provided, as desired. The runways, which receive upon them the wheels, are arranged to not only swing on their pivots, but also move bodily relatively to the platform, so as to pass bereath the wheels after the wagon has been drawn onto the platform and trig them.

Figure 1 shows in side elevation a platform-car provided with means embodying this invention, whereby a wagon may be drawn onto and off of the platform and its wheels trigged. Fig. 2 is a plan view of the platform-car shown in Fig. 1.

*a* represents the platform-car, and it will be provided with suitable means whereby it may be attached to an electric or other car, as a trailing-car, and be thereby conveyed from place to place.

At each end of the platform of the car runways are pivoted, and, as herein shown, three such runways, as $b$, $c$, and $d$, are provided at each end of the car. The runways $b$, $c$, and $d$ are arranged in parallelism and disposed at suitable distances apart. The two outside runways $b$ and $d$ will be so disposed as to receive the wheels of the wagon and the intermediate runway $c$ used for the horse. The intermediate runway $c$ is pivoted at $c'$ to the end of the platform. The two outside runways $b$ and $d$ are also pivoted to the end of the platform; but in order that said runways may be employed as trigs for the wheels of the wagon and be moved into position beneath said wheels they are provided with pivot-pins $b'$ $d'$, which enter slots or guideways $b^2$ $d^2$, formed or provided in suitable brackets or supports $b^3$ $d^3$, said slots or guideways being herein shown as formed horizontally for a portion of their length and having offset ends. I do not desire, however, to limit my invention to any particular manner of pivotally connecting the runways to the platform nor to the number of runways employed, so long as they are adapted to serve as trigs for the wheels in addition to serving as runways. When the runways are swung so as to project from the platform, as represented by full lines, the wagon may be drawn onto the platform by the horse, and then said runways may be swung on their pivots over upon the platform and the runways $b$ and $d$ moved inward bodily, so as to project beneath and trig the wheels of the wagon.

The brackets or supports $b^3$ $d^3$, projecting above the surface of the platform, serve as guides for the wheels when drawing the wagon off of the platform.

I claim—

1. The combination with a platform-car, of runways pivotally connected to the ends thereof which may be turned over upon the car-platform into position to serve as trigs for the wheels of a wagon on the platform, substantially as described.

2. The combination of a platform-car, of runways c pivotally connected to each end of the platform, and runways b and d also pivotally connected to each end of the platform at opposite sides of said runways c, and bodily movable relatively to said platform to trig the wheels of the wagon when turned over upon the platform, substantially as described.

In testimony whereof I have signed my name to this specification in the presence of two subscribing witnesses.

EDWARD C. HUSE.

Witnesses:
B. J. NOYES,
H. B. DAVIS.